(12) United States Patent
Smiljanic

(10) Patent No.: US 7,852,769 B2
(45) Date of Patent: Dec. 14, 2010

(54) FLEXIBLE BANDWIDTH ALLOCATION IN HIGH-CAPACITY PACKET SWITCHES

(76) Inventor: Aleksandra Smiljanic, 96 E. Ave., Apt. 3, Atlantic Highlands, NJ (US) 07716

( * ) Notice: Subject to any disclaimer, the term of this patent is extended or adjusted under 35 U.S.C. 154(b) by 0 days.

(21) Appl. No.: 12/316,066

(22) Filed: Dec. 9, 2008

(65) Prior Publication Data

US 2009/0097497 A1 Apr. 16, 2009

(51) Int. Cl.
*H04J 1/16* (2006.01)
*H04J 3/16* (2006.01)
*H04L 12/28* (2006.01)

(52) U.S. Cl. .................... 370/235; 370/412; 370/465
(58) Field of Classification Search ............... 370/235, 370/412, 465
See application file for complete search history.

(56) References Cited

U.S. PATENT DOCUMENTS

| 6,618,379 B1* | 9/2003 | Ramamurthy et al. .. 370/395.41 |
| 6,885,639 B2* | 4/2005 | Kamiya ..................... 370/235 |
| 7,006,514 B2* | 2/2006 | Oki et al. ................... 370/415 |
| 7,058,063 B1* | 6/2006 | Cavendish ............. 370/395.41 |
| 2002/0181483 A1* | 12/2002 | Oki et al. .................... 370/413 |

* cited by examiner

*Primary Examiner*—Andrew Lee

(57) ABSTRACT

A method and apparatus for flexible sharing of bandwidth in switches with input buffering by dividing time into a plurality of frames of time slots, wherein each frame has a specified integer value of time slots. Counters associated with the input-output queues of the switches are loaded with a negotiated integer value once per frame. The inputs sequentially select available outputs to which the inputs send packets in specified future time slots. Priority is given to input-output queues with counters having positive values. The selection of outputs by the inputs is done using a pipeline technique and a schedule is calculated within multiple time slots. The counters for selected queues are then decremented by 1.

1 Claim, 4 Drawing Sheets

FLEXIBLE BANDWIDTH ALLOCATION IN HIGH-CAPACITY PACKET SWITCHES

REFERENCE TO RELATED APPLICATIONS

This is a Continuation of U.S. patent application Ser. No. 11/258,258, filed Oct. 25, 2005, now U.S. Pat. No. 7,463,641, which is a divisional of U.S. patent application Ser. No. 09/881,038, filed Jun. 15, 2001 now U.S. Pat. No. 7,072,353, which claims priority to Provisional Patent Applications Nos. 60/211,474 filed Jun. 15, 2000; 60/213,250 filed Jun. 22, 2000 and 60/260,526 filed Jan. 10, 2001.

BACKGROUND OF THE INVENTION

The present invention generally relates to the field of computer packet-switched networks and more particularly, is directed to a method and apparatus for flexible bandwidth allocation in a high capacity packet switch.

As known in the prior art, packet switches transfer packets from their inputs to the specified outputs. It is important to be able to flexibly share an output bandwidth among the inputs. In other words, inputs should be guaranteed to get the negotiated bandwidth even if some other inputs are overloaded. A switch with output buffers is usually a set of statistical multiplexers. Packets coming from different inputs are stored in the output buffer and transmitted according to some scheduling policy. For example, a weighted round-robin (WRR) policy would provide to the inputs their reserved bandwidth shares. However, the capacity of a switch with output buffers is limited by the speed of the output buffers.

In contrast, the capacity of a switch with input buffers is not limited similarly because packets are stored at the line bit-rate. Switches with input buffers can provide a much higher switching capacity which is why they have attracted much interest recently in the published literature. In a switch with input buffers, a packet competes not only with the packets of other inputs bound for the same output, but also with the packets of the same input bound for other outputs.

Several proposed protocols calculate the maximal matching between inputs and outputs that does not leave input-output pair unmatched if there is traffic between them. However, these protocols do not provide flexible sharing of the output bandwidth among the inputs in a switch with input buffers. Accordingly, there is a need in the art for an improved method and apparatus for such purposes.

BRIEF SUMMARY OF THE INVENTION

Accordingly, it is an overall object of the present invention to obviate the above-noted shortcomings and disadvantages of bandwidth allocation protocols in packet switches known in the prior art.

A further object of the present invention is to provide an improved method and apparatus for bandwidth allocation in packet switches.

Another object of the present invention is to an provide an improved method and apparatus for bandwidth allocation in packet switches which can be easily and inexpensively implemented.

Another object of the present invention is to an provide an improved method and apparatus for fast bandwidth allocation in circuit switches.

These another objectives of the present invention are achieved by the present invention as described below.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DESCRIPTION OF THE PREFERRED EMBODIMENT

Figure 1A:
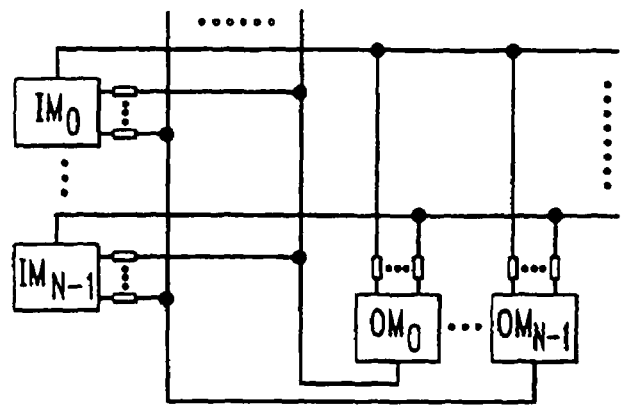
FIG. 1 is a block diagram for a central controller for the PIM protocol.
Figure 1B:
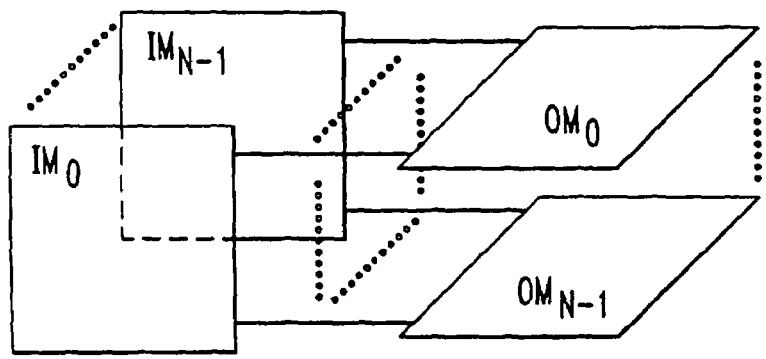

In accordance with the present invention, a new protocol is proposed which is simpler than the previously proposed ones, and can, consequently support packet switching of higher capacity. The maximal matching of inputs and outputs not only removes the head-of-line (HOL) blocking, but also simplifies the flexible bandwidth sharing in a switch with input buffers.

The simplest way to share the bandwidth in a switch with input buffering is to precompute a schedule in advance based on the reservations made in a connection set up phase. Time is divided into frames that consist of time slots. The schedule determines input-output pairs that will be connected in each time slot of a frame. Each input-output pair is assigned a certain number of time slots within a frame, which ensures the requested bandwidth share. It can be shown that requests can be accommodated as long as $$\sum_m a_{im} \leq F \text{ and} \quad (1)$$

$$\sum_m a_{mj} \leq F \text{ for}$$

$$0 \leq i, j \leq N-1,$$

Where $a_{ij}$ is the number of time slots requested by input-output pair $(i, j)$, F is the frame length, and N is the number of input and output ports. As a result, the bandwidth reserved for input-output pair $(i, j)$ is $p_{ij}=a_{ij}/F$ times the line bit-rate. However, computing the schedule has a complexity on the order of $O(FN^2)$, and may become impracticable for the fast varying traffic. For this reason, a statistical matching algorithm has been proposed to arbitrarily share the switch capacity. In the statistical matching algorithm, output j grants input i with probability $p_{ij}=a_{ij}/F$. Each input chooses one output from which it received a grant in a specified probabilistic way. It has been shown that the statistical matching uses 63% of the total switch capacity, or 72% if two iterations are performed. Weighted probabilistic iterative matching (WPIM) has also been proposed instead of statistical matching. They argue that the computing of several distribution functions within one time slot, as in statistical matching, becomes impractical in high-capacity switches. In WPIM, time is divided into frames, and input-output pair $(i, j)$ is assigned $a_{ij}$ credits within each frame. Namely, a counter associated to input-output pair (i, j) is set to $c_{ij}=a_{ij}$ at the beginning of a frame, and is decremented whenever this queue is served. Queues with positive counters compete for transmission with higher priority. They are rewarded according to the parallel iterative matching (PIM) algorithm. Remaining queues compete for the rest of the bandwidth, and they are again rewarded according to the PIM algorithm. The performance of the WPIM protocol has been assessed only through simulations.

A scheduling algorithm for flexible bandwidth reservations in a WDMA optical network with input buffering has also been proposed. If the number of wavelengths equals the number of users, such WDMA network is equivalent to a switch with input buffering. In the proposed scheduling algorithm, each input-output queue is associated with a counter which is increased in each time slot by $p_{ij}$, and decreased by 1 if this queue has been served. Queues with positive counters compete for service, and they are served according to some efficient maximal weighted matching algorithm. For example, queues are considered for service in the order in which their counters decrease. Since it processes $N^2$ input-output pairs, this algorithm can also become a bottleneck in high-capacity switches. It was shown in that this algorithm guarantees 50% of the switch capacity.

In accordance with the present invention, new protocol, the weighted round-robin greedy scheduling (WRRGS), that provides flexible bandwidth sharing in switches with terabit capacity. Terabit switches involve more than 100 ports, line bit-rates as high as 10 Gb/s, and processing times (equal to packet transmission times) of 10-100 ns. Our approach is similar to the WPIM, only it is based on the round robin greedy scheduling (RRGS) protocol instead of the PIM. In this way, the WRRGS implementation is further simplified in a comparison to the WPIM. The PIM algorithm performs 2 $\log_2 N+2$ selections on average in order to find maximal matching, and involves the full interconnection between input and output modules of the central controller. On the other side, the RRGS algorithm performs only one selection per time slot, and involves simple structure of the central controller. So, WRRGS can potentially be used in a switch with a larger number of ports and/or higher line bit-rate, i.e. in a switch with a higher capacity. Applicant has shown that WRRGS can flexibly allocate at least 50% of the total switch capacity.

Different architectures for optical packet-switching fabrics have been proposed. Optical cross-connects capable to reconfigure on the nanosecond time scale seem to be the best candidates for a switch core due to their simplicity. Namely, the complexity and cost of the optical technology are very high, so that simplicity of the switch core is essential. Key fast switching optical devices that can be used in packet switches are semiconductor optical amplifiers (SOA) and rapidly tunable lasers.

In the most straightforward design, a packet switch with N inputs and N outputs requires $N^2$ SOAs which are playing the role of gates. However, by combining WDM with space division multiplexing, the overall switch complexity measured in the number of SOAs is significantly reduced: the number of SOAs in a switch is decreased to $2N\sqrt{N}$, while $\sqrt{N}$ waveguide routers (WGR) of size $\sqrt{N}\times\sqrt{N}$ are added. The 257×256 switch with the switching time of 5 ns has been demonstrated. If line bitrate is 10 Gbps, short packets of 64 bytes last 64 ns and could be successfully switched in the proposed architecture. The total switching capacity in that case would be 256× 10 Gb/s=2.56 Tb/s.

Alternatively, each input of a packet switch is equipped with the fast tunable laser which is connected to the outputs through large WGR. Fast tunable laser tunes to the wavelength that will be routed by WGR to the packet designated destination. An 80×80 switch with the switching time of 100 ns has been demonstrated. Thus, the proposed architecture would switch only longer packets. But, the long switching time is the result of the driver design and not the laser limitation. It has been shown in that the same laser can tune among wavelengths within less than 15 ns.

A. Protocol Description

The WPIM and WRRGS protocols compare similarly as the PIM and RRGS protocols. The PIM protocol consists of several iterations: all inputs send requests to the outputs for which they have packets to send, requested outputs send acknowledgements to their selected inputs, and selected inputs choose one output each. Inputs and outputs that have not been selected in the previous iterations compete in the next iteration in the same way.

It has been shown that the PIM algorithm finds a maximal matching after in $\log_2 N+\frac{3}{4}$ iterations on average. Each iteration involves two selections, and all iterations have to be completed one after another within one packet transmission time. The planar and two-dimensional designs of the central controller that execute the PIM algorithm are shown in FIG. 1(a) or (b), respectively. Each input module (IM) sends a request to each output module (OM) and each OM sends an acknowledgement to each IM. There should be $2N^2$ wires connecting input and output modules. Such central controllers may become difficult for implementation as N grows. On the other side, the RRGS protocol consists of N steps. In the first step, some particular input chooses one of the outputs for which it has packets to send. In each following step, the next input chooses one of the remaining outputs for which it has packets to send. Clearly, RRGS can be implemented by using a pipeline technique. Each step of the algorithm is completed within a separate time slot, and the algorithm is completed within N time slots. But, in each time slot, all inputs choose outputs for different time slots in future, so, the central controller is calculating in parallel schedules for N future time slots. As a result, only one selection has to be performed within one time slot (other N−1 simultaneous selections are done in parallel).

Figure 2:
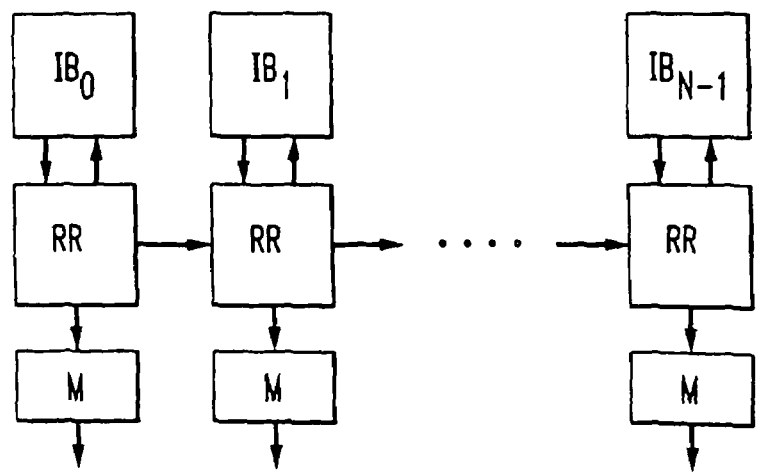
FIG. 2 is a block diagram for a central controller for the RRGS protocol.

A simple structure of the central controller that executes the RRGS algorithm is shown in FIG. 2. A round-robin (RR) arbiter associated to each input module communicates only with the RR arbiters associated to adjacent input modules, and the complex interconnection between input and output modules is avoided. It stores addresses of the reserved outputs into the memory (M). Price that RRGS pays for its simplicity is the additional pipeline delay, which is on average equal to N/2 time slots. This pipeline delay is not critical for assumed very short packet transmission time.

The RRGS protocol needs to be further modified in order to provide flexible sharing of the total switch capacity. We propose that time is divided into frames, and counter associated with input-output queues are set to their negotiated values at the beginning of each frame, as in WPIM. Queues with positive counters compete with higher priority according to RRGS. Then, the remaining queues contend according to RRGS for the available bandwidth.

Consider an N×N cross-bar switch, where each input port i. i∈{0, 1, . . . , N−1}, has N logical queues, corresponding to each of the N outputs. All packets are fixed size cells. The output of the protocol is a schedule or a set S={(i, j)|packet will be sent from input i to output j}. Note that in each time slot, an input can only transmit one packet, and an output can receive only one packet. The schedule for the kth time slot is determined as follows:

Step 1: If k=1 mod F then $c_{ij}=a_{ij}$;
Step 2: $I_k=O_k=\{0,\ldots,N-1\}$; i=0;
Step 3: Input i chooses in a round-robin fashion output, if any, j from $O_k$ such that $c_{ij}>0$, and i there are unscheduled packets in queue (i, j); if there is no such j go to Step 5.
Step 4: Remove j from $O_k$ and i from $I_k$; Add (i, j) to $S_k$; $c_{ij}=c_{ij}-1$;
Step 5: If i<N−1 choose i=i+1 and go to Step 3;
Step 6: i=0;
Step 7: If i∈$I_k$ choose j from $O_k$ for which it has unscheduled packets to send; if there is no such j go to Step 9;
Step 8: Remove j from $O_k$ and i from $I_k$; Add (i, j) to schedule $S_k$;
Step 9: If i<N−1 choose i=i+1 and go to Step 7;

In steps 1-5, prioritized packets compete for a service according to RRGS. Then, in steps 6-9, the remaining packets compete once again for the given time slot according to RRGS. Steps 6-9 are optional, they will increase the efficiency of WRRGS, but introduce an additional average pipeline delay of N/2 time slots. They, actually, represent a service for the best-effort traffic. Note that in RRGS input 0 is always the first to pick up an output, while in originally proposed RRGS all inputs get chance to be the first to choose an output. In the latter case an input might reserve an output in the earlier time slot for the later time slot in future, in other words, it might interchangeably reserve outputs for different frames. So, each queue should be assigned multiple counters related to different frames.

B. Pipelined WRRGS

Figure 3:
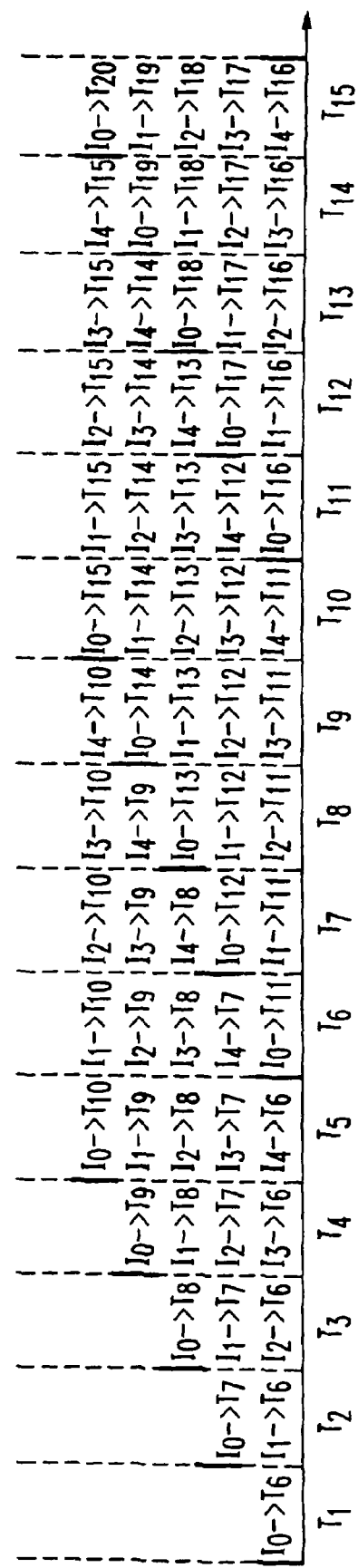
FIG. 3 is a time diagram for a switch controller in accordance with the present invention.

First consider steps 1-5 of the pipelined WRRGS. WRRGS as outlined in the previous section is easy to implement by using a pipeline technique. In time slot k, input i reserves an output for time slot k+N−i within frame $\lceil(k+N-i)/F\rceil$, where $\lceil x \rceil$ is the smallest integer not smaller than x. Also, input i resets its counters $c_{ij}$, 0≦j≦N−1, in time slots mF+1−N+i, where m≧$\lceil N/F \rceil$. Time diagram for this first case of WRRGS applied in a 5×5 switch is shown in FIG. 3. This figure shows the relation between inputs and the time slots for which they are choosing their outputs. For example, in time slot $T_5$, input $I_1$ is scheduling or choosing an output for transmission during time slot $T_9$, while $I_3$ is scheduling for time slot $T_7$ and so on. After it chooses an output, e.g., input $I_1$ forwards the control information (about available outputs) to input $I_2$ which reserves an output for time slot $T_9$ in the next time slot $T_6$. Bold vertical line denotes that input $I_0$ starts a new schedule choosing any of the outputs, i.e. it does not receive the control information from input $I_4$.

Figure 4:
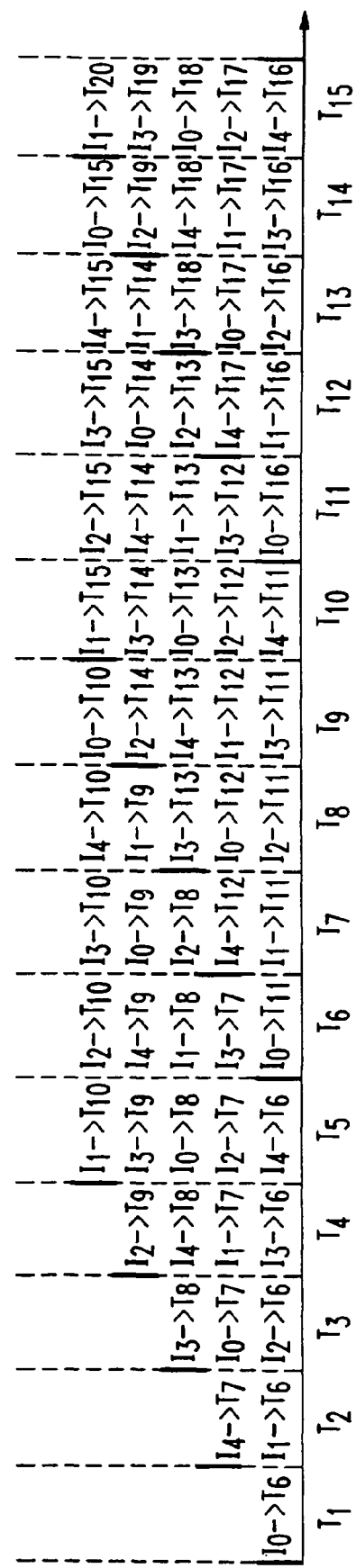
FIG. 4 is a time diagram for a the switch controller in accordance with another embodiment of the present invention.

Pipelining proposed for RRGS in might be applied to WRRGS in order to equalize inputs. Time diagram for this case of WRRGS applied in a 5×5 switch is shown in FIG. 4. Here, in each time slot another input starts a schedule. But, an input might interchangeably reserve outputs for different frames. For example, input $I_0$ reserves an output for time slot $T_{11}$ in time slot $T_6$, and it reserves an output for time slot $T_9$ in the next time slot $T_7$. If the frame length is F=5, then input $I_0$ interchangeably reserves outputs for frames $F_3$ and $F_2$. For a reasonable assumption that F≧N, an input might interchangeably reserve outputs for at most two consecutive frames. So, each queue should be assigned multiple counters related to different frames. Depending on the future time slot for which an input reserves an output, a specified counter of the chosen queue will be decremented by one. Counters are reset every F time slots.

Figure 5:
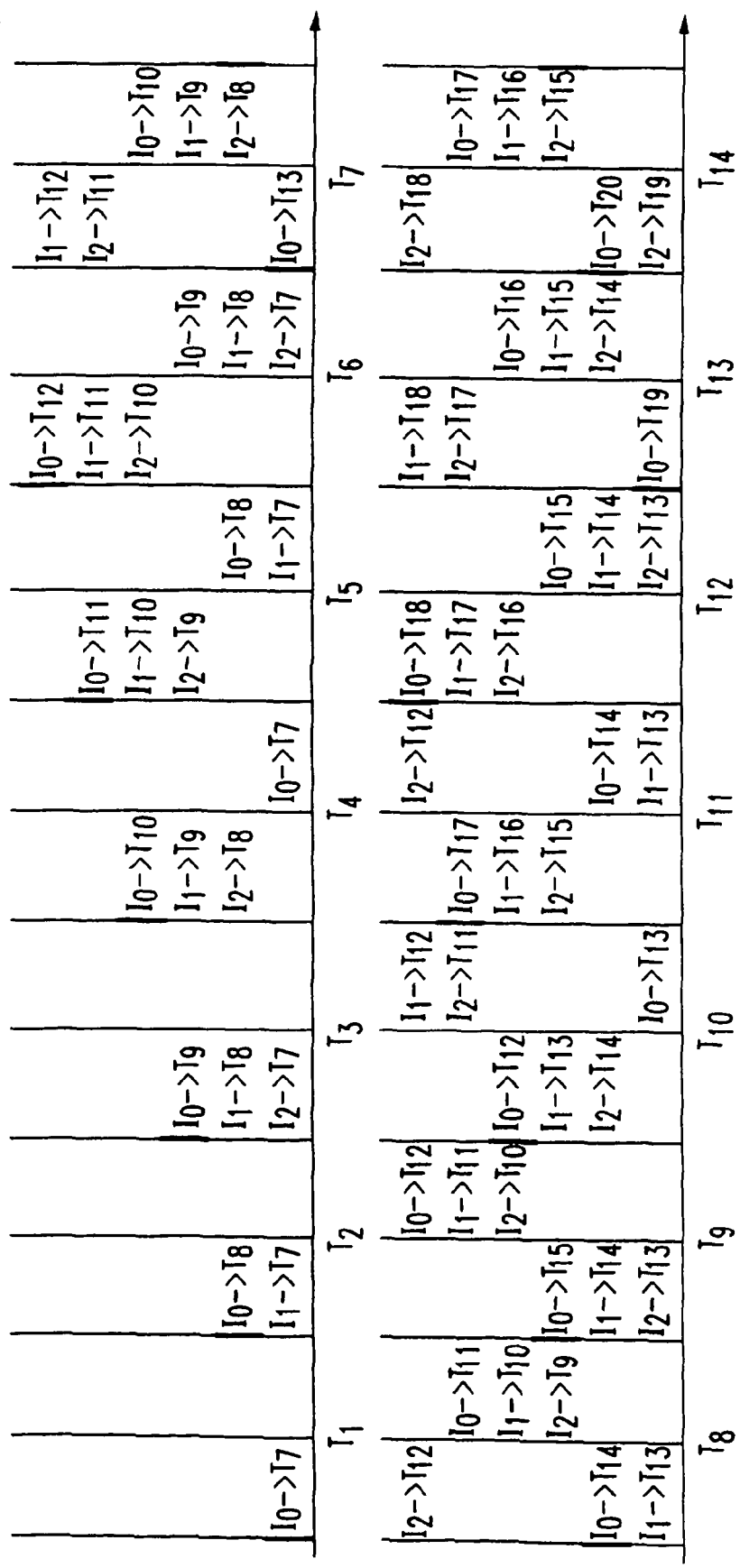
FIG. 5 is a time diagram for a switch controller in accordance with a further embodiment of the present invention.

Let us now consider all 1-9 steps of the pipelined WRRGS, including service of the best-effort traffic. In any time slot k, each input chooses outputs for two different time slots in future, k+N−i and k+2N−i within frames $\lceil(k+N-i)/F\rceil$ and $\lceil(k+2N-i)/F\rceil$. First, an input reserves an output with the positive counter for time slot k+2N−i, then, it reserves any output for time slot k+N−i. Also, input i resets its counters $c_{ij}$, 0≦j≦N−1, in time slots mF+1−2N+i where m≧$\lceil 2N/F \rceil$. FIG. 5 shows the time diagram for all 1-9 steps of WRRGS applied in a 3×3 switch. For example, in time slot $T_7$, input $I_1$ chooses one of the available prioritized outputs for the time slot $T_{12}$, and then it chooses any of the available outputs for time slot $T_9$. This is because input $I_1$ uses its first chance to schedule for time slot $T_{12}$ in time slot $T_7$, and, therefore, it considers only queues with positive counters. On the other side, input $I_1$ uses the second chance to schedule for time slot $T_9$ in time slot $T_7$, and, therefore, it considers all queues for service. It is possible to equalize inputs assuming service of the best-effort traffic as well.

C. Protocol Performance

It is essential to determine the portion of the switch capacity that a scheduling algorithm can share among the inputs. More precisely, we want to determine the maximum admissible utilization, p, of any input or output line:

$$\sum_m p_{im} = \frac{1}{F}\sum_m a_{im} \leq p,$$

$$\sum_m p_{mj} = \frac{1}{F}\sum_m a_{mj} \leq p,$$

$$0 \leq i, j \leq N-1,$$

which can be guaranteed to the input-output pairs. So, if input-output pair (i, j) requests a new portion of bandwidth, $\Delta p_{ij}$, it is accepted if:

$$\sum_m p_{im} + \Delta p_{ij} \leq p,$$

$$\sum_m p_{mj} + \Delta p_{ij} \leq p,$$

and input-output pair (i, j) is assigned $\Delta a_{ij} = \lceil \Delta p_{ij} \cdot F \rceil$ new time slots per frame. We will prove that p=½ for the WRRGS, due to the fact that the RRGS finds a maximal matching between inputs and outputs.

Lemma: 1 The WRRGS protocol ensures $a_{ij}$ time slots per frame to input-output pair (i, j), 0≦i,j≦N−1, if the following condition holds:

$$\sum_m a_{im} + \sum_m a_{mj} - a_{ij} \leq F, \qquad (2)$$

Proof: Only prioritized packets are being viewed as if WRRGS consists only of steps 1-5. Observe time slots within a frame in which either input i or output j are connected, but they are not connected to each other. In each of these time slots, sum $$s_{ij} = \sum_{m \neq j} c_{im} + \sum_{m \neq i} c_{mj}$$

is greater than 0, and then it is decremented by at least 1. Sum $s_{ij}$ is the largest at the beginning of a frame and from (2), it fulfills:

$$s_{ij} = \sum_{m \neq j} a_{im} + \sum_{m \neq i} a_{mj} \leq F - a_{ij}, \qquad (3)$$

As a conclusion, in at least $a_{ij}$ time slots per frame neither input i is connected to some output other than j, nor output j is connected to some input other than i. In these time slots, input i reserves output j if there are packets in queue (i, j) and unused credits $c_{ij}>0$. This is because none of the inputs have chosen output j before input i, and input i is not choosing any other output. Therefore, input i will choose output j as supposed by RRGS, and by any other algorithm that finds a maximal matching between inputs and outputs. In summary, if condition (2) is fulfilled then $a_{ij}$ time slots per frame are guaranteed to input-output pair (i, j).

Lemma 2: The WRRGS protocol ensures $a_{ij}$ time slots per frame to input-output pair (i, j), $0 \leq i,j \leq N-1$, if the following condition holds:

$$\sum_m a_{im} \leq \frac{F+1}{2}, \qquad (4)$$

$$\sum_m a_{mj} \leq \frac{F+1}{2},$$

Proof: From inequality (4), it follows that:

$$\sum_m a_{im} + \sum_m a_{mj} \leq F + 1 \Rightarrow$$

$$\sum_m a_{im} + \sum_m a_{mj} - a_{ij} \leq F,$$

since $a_{ij} \geq 1$. Because inequality (4) implies inequality (2), Lemma 1 directly follows from Lemma 2.

Theorem: The WRRGS protocol ensures $p_{ij}$ of the line bit-rate to input-output pair (i, j), $0 \leq i,j \leq N-1$, if the following condition holds:

$$\sum_m p_{im} \leq \frac{1}{2}, \qquad (5)$$

$$\sum_m p_{mj} \leq \frac{1}{2},$$

Proof: Condition (5) implies (4), so Theorem follows from Lemma 2. The above theorem holds for the WPIM as well, considering the fact that PIM finds a maximal matching between inputs and outputs.

Admission control in WRRGS is simple, new $a_{ij}$ time slots are assigned to input-output pair (i, j) if:

$$\sum_m a_{im} + \Delta a_{ij} \leq \frac{F+1}{2}, \qquad (6)$$

$$\sum_m a_{mj} + \Delta a_{ij} \leq \frac{F+1}{2},$$

Central controller does not have to precompute schedule when a new request is admitted. Only input i has to update the value of $a_{ij}$ $a_{ij}+a_{ij}$, 0 j N−1, in order to set the correct counter value $c_{ij}=a_{ij}$ at the beginning of each frame. Consequently, WRRGS can follow fast changes of traffic pattern.

Let us assume that N is the number of inputs and outputs, F is the frame length in time slots, $v_b$ is the line bit-rate, and Tp is the packet transmission time. The maximum switch throughput is:

$$C = N \cdot v_b. \qquad (7)$$

The session admission time equals the frame duration which is equal to:

$$A = F \cdot Tp. \qquad (8)$$

If some input-output pair is assigned one time slot per frame, it is guaranteed the bandwidth of:

$$G = v_b \cdot Tp/(F \cdot T_p) = v_b/F. \qquad (9)$$

So, G is the traffic granularity. The line bit-rate $v_b$ and the packet transmission time Tp are limited by the technology, and the frame length F can be chosen arbitrarily. There is an apparent trade-off between the admission time and the traffic granularity: by increasing F the granularity is refined and the admission time is prolonged and vice versa. For some realistic parameters vb =10 Gbps, Tp=50 ns and chosen F=$10^4$, the admission time is A=$10^4 \cdot 50$ ns=500 μs, and the traffic granularity is G=10 Gbps/$10^4$=1 Mbps. So, the proposed switch can rapidly allocate bandwidth with fine granularity.

Packets generated by some source for the given destination may have to pass through multiple switches. Therefore, the bandwidth should be reserved at each of these switches. With WRRGS, the bandwidth reservation at a particular switch is equivalent to the bandwidth reservation through the input and output lines in question. A switch stores the information about the bandwidth assigned to any input or output line, and would advertise this information to the other switches in the network by using interior gateway protocols (IGP). As has been shown, half of each link bit-rate can be reserved. Accordingly, the procedure for bandwidth reservation in wide area network becomes very simple. Namely, links with that do not have enough of the spare capacity are removed, and, then, the route is found by using the shortest path algorithm, for example. The small number of high-capacity switches would allow the fast bandwidth reservation in the wide area network.

The scheduling technique of the present invention can also be used for fast bandwidth reservations in high-capacity circuit switches. Instead of reserving an output for a single time slot in the future, an input reserves an output for a certain time slot of each frame. Afterwards, input also terminates the reservation. Unlike prior approaches, input modules must store the information about outputs reserved in each time slot of a frame. An input module also stores a table about its reserved output in each time slot of a frame. Moreover, the time slot duration can be very short in circuit switches, so that a selection takes multiple, e.g. r, time slots to be calculated. It follows that the bandwidth allocation can be changed in every block of r frames. Both bandwidth reservation and release are based on credits. At the beginning of a block of frames, each counter is loaded to the difference of the number of time slots newly assigned to the input-output pair, and the number of time slots released by this pair.

If the counter value is negative, an input-output pair releases its previously assigned time slot and increments the counter by one, until it becomes zero. Otherwise, if the counter value is positive, an input-output pair reserves time slots in a frame, and decrements the counter until its value is zero. As before, new bandwidth is allocated to some input-output pair if inequalities are fulfilled. Inputs sequentially release previously assigned time slots and then sequentially reserve admitted time slots, one after another. Pipelining can be applied. For example, input i releases an output $r(2N-i+1)$ time slots in advance, and reserves an output $r(N-i+1)$ time slots in advance. Input picks up output that has not been reserved in some of the previous blocks of frames, or by some of the previous inputs which reserve the outputs for the same time slot in the current block of frames. Note that each node would learn about all released and reserved outputs for some future time slot exactly $r \cdot N$ time slots after it releases or reserves an output for that time slot. So, the node can store the information in its tables before the next block of frames as long as rN rF, which is the case of interest. In a conclusion, in arbitrary block of frames the scheduler accepts new bandwidth requests, in the next block of frames it calculates new time slot assignment, and finally in the third block of frames the circuits are switched according to the new schedule. Of course, this process is also pipelined so that the switch time slot assignment can be changed at the beginning of each block of frames.

In accordance with the present invention, a simple way to flexibility share bandwidth in switches with input buffering has been described. The simplicity of the proposed protocol makes it attractive for switching of several Tb/s, assuming the current technology. It has also been shown that the proposed WRRGS can share at least 50% of the total switch capacity.

WRRGS has several desirable features. First, WRRGS algorithm can serve traffic with fast varying bandwidth requirements typical in data networks. Second, WRRGS requires simple processing: only two round-robin choices are to be performed within one time slot. So, it can switch short cells transmitted at high bit-rates. In addition, a linear structure of the central controller easily scales to accommodate a large number of input and output ports, and provide high switching capacity.

While there are given above certain specific examples of this invention and its application in practical use, it should be understood that they are not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

The invention claimed is:

1. A method of passing packets through a packet switch having a plurality of inputs and a plurality of outputs, with each input having a buffer that contains a queue for each of said outputs and a counter associated with each of said queues, where information sources are coupled to said switch, the method comprising the steps of:

obtaining information at connection set up regarding desired bandwidth for packets arriving at an input of said switch; and executing a scheduling algorithm for passing said packets, with cognizance of said bandwidth, which algorithm employs a weighted round-robin greedy scheduling algorithm, employing an initial process where prioritizes packets compete for a service, and a subsequent process where remaining packets compete.

* * * * *